US008413897B2

(12) United States Patent
Peyrot

(10) Patent No.: US 8,413,897 B2
(45) Date of Patent: Apr. 9, 2013

(54) DEVICE FOR SECURING AN ENCLOSED SPACE BY IDENTIFICATION

(76) Inventor: Yvan Peyrot, Courbevoie (FR)

( * ) Notice: Subject to any disclaimer, the term of this patent is extended or adjusted under 35 U.S.C. 154(b) by 848 days.

(21) Appl. No.: 11/833,766

(22) Filed: Aug. 3, 2007

(65) Prior Publication Data

US 2009/0152347 A1 Jun. 18, 2009

(51) Int. Cl.
*G06K 5/00* (2006.01)

(52) U.S. Cl. .......................................................... 235/382

(58) Field of Classification Search .................. 235/380, 235/375, 379, 383, 492, 493, 491

See application file for complete search history.

(56) References Cited

U.S. PATENT DOCUMENTS 6,720,874 B2 * 4/2004 Fufido et al. .................. 340/541
7,056,179 B2 * 6/2006 Courtney ........................ 441/90
2002/0067259 A1 * 6/2002 Fufidio et al. ................. 340/541
2006/0290519 A1 * 12/2006 Boate et al. ................ 340/573.4
2007/0249323 A1 * 10/2007 Lee et al. ...................... 455/411
2009/0015373 A1 * 1/2009 Kelly et al. .................. 340/5.62

* cited by examiner

*Primary Examiner* — Thien M Le

(57) ABSTRACT

The present invention concerns a device for securing an enclosed space by identifying the persons authorized to access, including: (i) at least one "human detection system" (3) whose issue(s) activate the entry(ies) (8*b*) of one or several comparator modules (8); (ii) identification units (i) of the aforesaid types able to communicate with the identification receiver(s) (2) in order to activate the entry(ies) (8*a*) of one or several comparator modules (8); and (iii) at least one, better several comparator modules (8) characterized by the fact that its (their) issue (8*c*) will be activated only if the entry (8*b*) of this same module has been activated, and the other entry (8*a*) has not been activated alter an adjustable delay. This device is characterized by the fact that an authorized person wears an identifying device which automatically allows the inhibition of the alarm system, which has been previously activated by human detectors.

6 Claims, 3 Drawing Sheets

DEVICE FOR SECURING AN ENCLOSED SPACE BY IDENTIFICATION

BACKGROUND OF THE INVENTION

The present invention concerns the protection of an enclosed space (for instance: parking areas, laboratories, and more generally any secured public places) by identifying the persons authorized to access it.

The protected areas concerned by the present invention can have a personal orientation (apartments, individual houses, single dwellings, detached houses, parking areas . . . ), as well as a professional one (offices, warehouses, factories, garages, barns . . . ).

At present, there are three large fields of electronic process aiming at protecting enclosed spaces.

These fields are: video surveillance (cameras, television recording units), access control (intercommunication systems, digicodes, electronic badges, biometrics) and anti-intrusion systems (alarms).

Video surveillance is assured by cameras monitoring a delimited space. The images are directly screened and/or recorded. Its main penalty is that, either a human surveillance is necessary to monitor a site, or the recorded images shall help to identify the criminal (s), but there is no way they can stop the intruders from committing the crime: video surveillance is not preventive.

The aim of access control systems is to physically prevent the persons non authorized to enter premises by locking the access (doors, gates, fences, . . . ). The buildings remain accessible with the provision to have the means to unlock the system (codes, keys, electronic badges, biological fingerprints . . . ). Its bad side is that its action is limited and that if an intruder manages to penetrate the place (passageways through the roof, through the window, with an authorized person, . . . ), access control is unable to ensure protection whatsoever any longer.

Concerning the anti-intrusion systems, their aim is to secure an enclosed space, not by protecting its access, but by identifying an unwanted human presence (when the system is on) which will activate a protection system. Detection is assured by captors placed inside the place to protect (door leaf opening, motions, glass break . . . ). However, protection is assured by deterrence (alarms, sirens, smoke candles, . . . ), and/or by transmitting a telephone warning to an intervention body (remote monitoring companies, private security organisations, police, . . . ). Even though there are alarm centrals also managing access controls, all current systems present a major shortcoming: They are not able to identify automatically if a person is authorized or not to penetrate the premises. They all need a human intervention to be armed or disarmed (on/off), so that there is no system capable of working continuously while managing a large flow of persons.

Consequently, there does not exist at present any autonomous system capable of ensuring in real time the security of the premises in presence of persons inside these same premises.

In other words, no existing system can ensure a reliable continuous protection and make the difference between detecting an intruder and an authorized person.

SUMMARY OF THE INVENTION

One aim of this present invention is thus to offer an installation to secure enclosed sites by an anti-intrusion system capable of making the difference between an intruder and an authorized person.

Another aim of this present invention is to offer an installation to secure enclosed sites whose design allows a continuous working of the system.

Another aim of this present invention is to offer an installation to secure enclosed sites whose design allows a swift identification, and thus to manage a large flow of persons.

Consequently, the invention aims at securing an enclosed space of the aforesaid type (parking areas, laboratories, high-risk areas, . . . ), characterised by the fact that an authorized person wears an identifying device (Transponders communicating by radio relay channel, magnetic badges, . . . ) which will automatically allow the inhibition of an alarm system, which has been previously activated by motion detectors properly concealed inside the premises to protect.

BRIEF DESCRIPTION OF THE DRAWINGS

The invention will be well understood by reading the following description, in reference to the appended schemes in which.

DETAILED DESCRIPTION OF THE INVENTION

Figure 1:
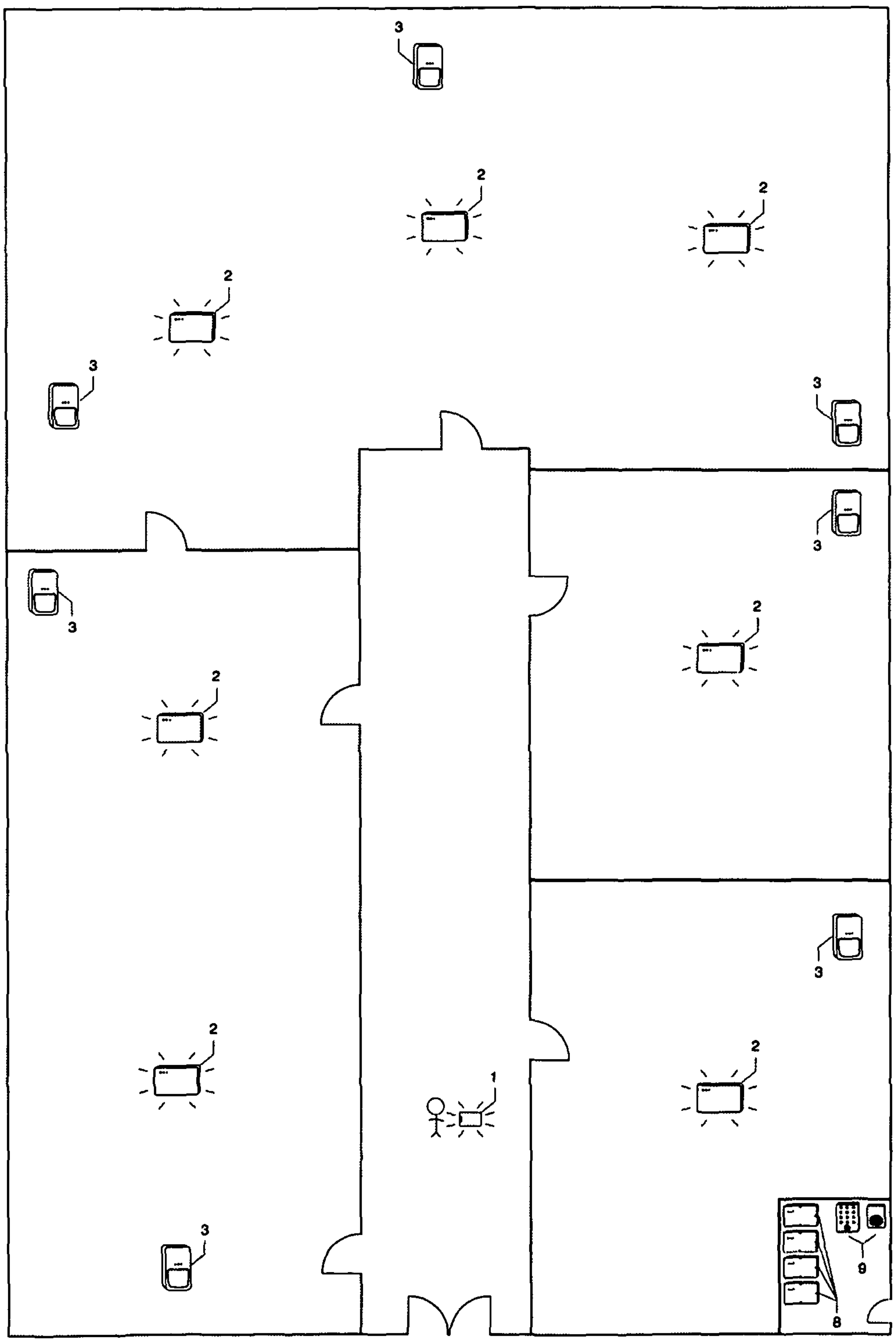
FIG. 1 represents an example of application of securing an enclosed space.

As mentioned above, the invention thus concerns the protection of an enclosed space whose FIG. 1 represents an example. The number of rooms and how they are arranged is not determining for its good operation but requires an adapted organisation of the different elements compounding it.

Figure 2:
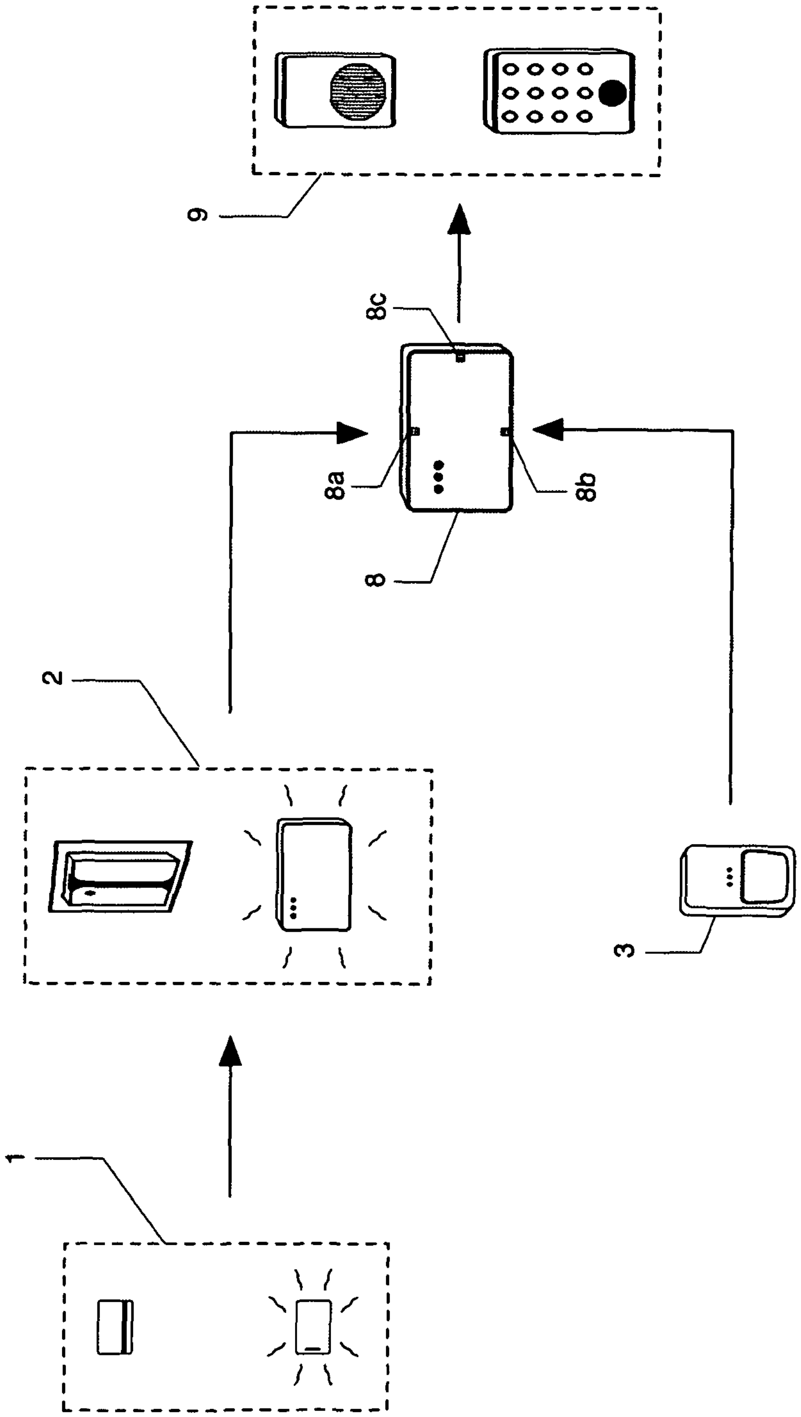
FIG. 2 represents in broad outline how the security system for an enclosed space conform to the invention works, according to a first mode of realisation.

FIG. 2 represents the system operation scheme, which can be described that way:

When an individual penetrates a secured space, he is detected by a motion detector 3 which transmits the detection information by activating the entry 8*b* of the comparator module 8, through which its issue is linked.

In the meantime, the individual who penetrates this secured space must have his identification process 1 (transponders communicating by radio relay channel, magnetic badges, . . . ). He must identify himself (magnetic badges, . . . ) or be automatically identified (Transponders communicating by radio relay channel, . . . ) by the identification receiver 2 within a prescribed time, and determined by an adjustable delay time (called "activation inhibition delay", consequently adjusting one of the parameters of the general system sensitivity) on the comparator module 8.

The identification receiver 2 transmits the identification information by activating the entry 8*a* of the comparator module 8 through which its issue is linked, disarming thus the comparator module 8. The comparator module 8 thus does not activate its issue 8*c*, which does not activate the protection system 9, and rearms itself after an adjustable delay (called "rearming delay"), consequently adjusting one of the parameters of the general system sensitivity.

Broadly speaking, the comparator module 8 activates its issue 8*c*—which activates the protection system 9 assured by deterrence (alarms, sirens, smoke candles, . . . ), and/or by transmitting a telephone warning to an intervention body (remote monitoring companies, private security organisations, police, . . . )—only if the entry 8*b* of this module has been activated and the other entry 8*a* has not been activated after an adjustable delay (called "activation inhibition delay", consequently adjusting one of the parameters of the general system sensitivity), which no longer inhibits the activation of the protection system 9.

The number of motion detectors 3, of identification processes 1, of identification receivers 2, of comparator modules 8 and of protection systems 9 is not limited in an installation.

All these elements can be multiplied as many times as necessary on several different comparator modules 8 and/or on different protection systems 9, in order to be able to divide one secured enclosed space into several secured zones—inside this same space—associated to one or several groups of identification systems 1 authorized only inside this same zone.

Figure 3:
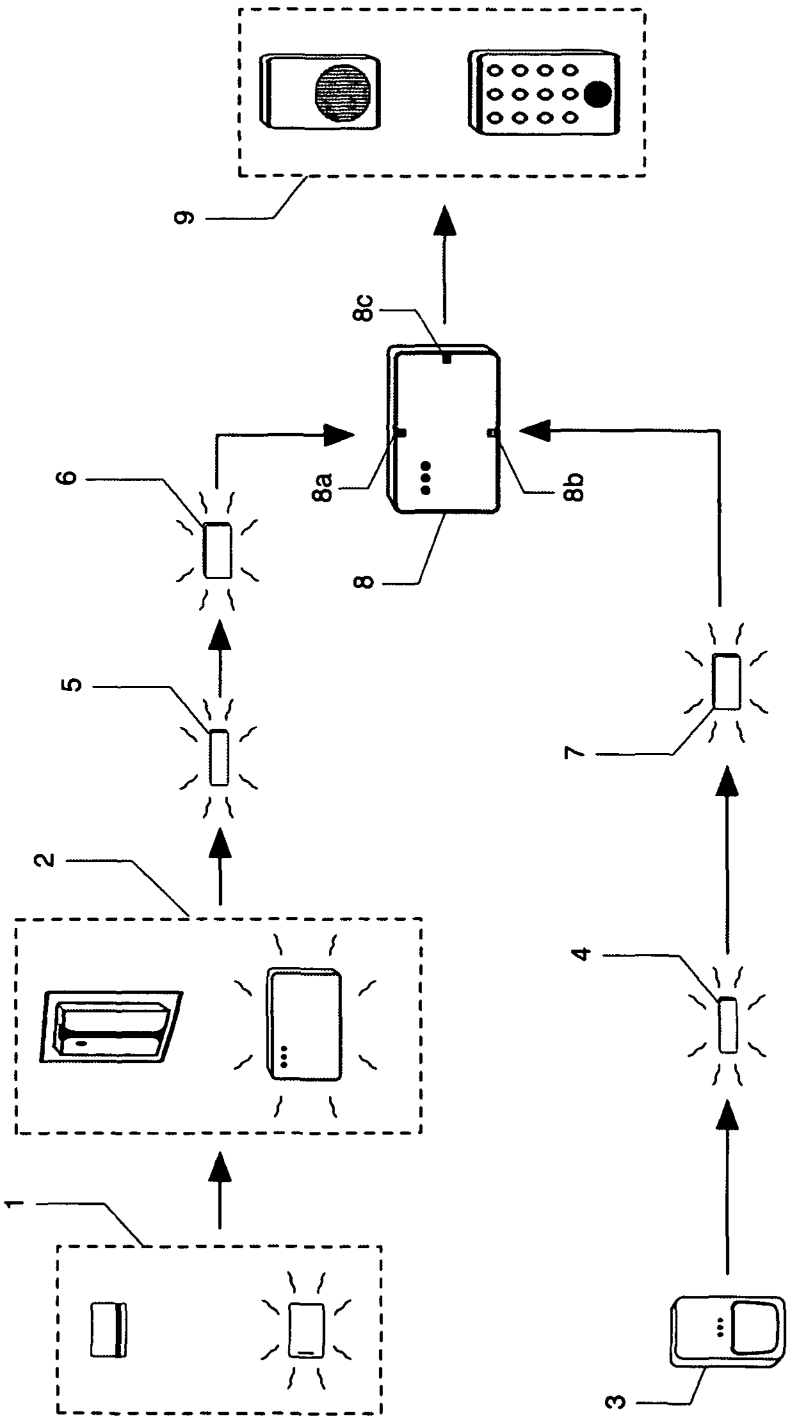
FIG. 3 represents in broad outline how the security system for an enclosed space conform to the invention works, according to a second possible mode of realisation.

FIG. 3 represents the operation scheme of the system, in case the cables are difficult to insert in an enclosed space (parking area, . . . ), which requires the use of a wireless radio transmission whose operation can be described as follows:

When an individual penetrates a secured space, he is detected by a motion detector 3 which transmits the information to a transmitter 4. This transmitter 4 is wireless radio with a unique identification code. The detection information so relayed is detected by a receiver 7 which, after identifying the transmitter code, guaranteeing thus the security in the wireless transmission, transmits the detection information and consequently activate the entry 8*b* of the comparator module 8 with which its issue is linked.

In the meantime, the individual who penetrates this secured space must have his identification process 1 (Transponders communicating by radio relay channel, magnetic badges, . . . ). He must identify himself (magnetic badges, . . . ) or be automatically identified (Transponders communicating by radio relay channel, . . . ) by the identification receiver 2 within a prescribed time and determined by an adjustable delay (called "activation inhibition delay", consequently adjusting one of the parameters of the general sensitivity of the system), on the comparator module 8.

The identification receiver 2 transmits the identification information to a wireless radio transmitter 5 which also has a unique identification code. The identification information so relayed is detected by a receiver 6 which, after identifying the transmitter code, guaranteeing thus the security in the wireless transmission, transmits the identification information and activates thus the entry 8*a* of the comparator module 8 with which its issue is linked, consequently disarming the comparator module 8.

The comparator module 8 thus does not activate its issue 8*c*, which does not activate the protection system 9, and rearms itself after an adjustable delay (called "rearming delay") consequently adjusting one of the parameters of the general system sensitivity.

Broadly speaking, the comparator module 8 activates its issue 8*c*—which will activate the protection system 9 assured by deterrence (alarms, sirens, smoke candles, . . . ), and/or by transmitting a telephone warning to an intervention body (remote monitoring companies, private security organisations, police, . . . )—only if the entry 8*b* of this module has been activated, and the other entry 8*a* has not been activated after an adjustable delay (called "activation inhibition delay", adjusting thus one of the parameters of the general system sensitivity), thus no longer inhibiting the activation of the protection system 9.

The number of motion detectors 3, of identification process 1, of identification receivers 2, of transmitters 4 et 5, of receivers 6 et 7, of comparator modules 8 and of protection systems 9 is not limited in an installation.

All these elements can be multiplied as many times as necessary on several different comparator modules 8 and/or on different protection systems 9, in order to be able to divide one secured enclosed space into several secured zones—inside this same space—associated to one or several groups of identification systems 1 authorized only inside this same zone.

The invention claimed is:

1. Device to secure an enclosed space by identifying the persons authorized to access it, comprising:

- one or several Human Detection System whose issue(s) activate one or several detection entry(ies) of one or several comparator modules,
- identification units of the aforesaid type which are able to communicate with the identification receiver(s) in order to activate the identification entry(ies) of one or several comparator modules,
- one or several comparator modules characterised by the fact that its (their) issue(s) is (are) activated only if the detection entry of this same module has been activated, and that its other identification entry has not been activated after an adjustable delay.

2. Device to secure an enclosed space according to claim 1, and including the use of a wireless transmission, associating one or several transmitters and receivers couples; assuring thus the wireless links between the Human Detection System (s) and the detection entry(ies) of the comparator module(s); and between the identification receivers and the identification entry(ies) of the comparator module(s).

3. Device to secure an enclosed space according to claim 1, characterised by the fact that the issue of a comparator module is activated only if its detection entry has been activated whereas its identification entry has not been activated after a specified delay.

4. Device to secure an enclosed space according to claim 1, characterised by the fact that its comparator module rearms itself automatically after a delay, if it has been disarmed by the activation of its identification entry.

5. Device to secure an enclosed space according to claim 1, characterised by the fact that its comparator module can have several detection entries, several identification entries and several issues.

6. Device to secure an enclosed space according to claim 1, characterised by the fact that its comparator module can be customized so that any of the detection entry(ies) can activate any of the issue(s), if the detection entry(ies) have not been deactivated by any of the identification entry(ies).

* * * * *